2 Sheets—Sheet 1.

J. H. RHAMY.
Wheel Cultivator.

No. 9,511. Reissued Dec. 21, 1880.

WITNESSES

John A. Ellis.
Philip P. Cellasi.

INVENTOR

Jno. H. Rhamy,
by Anderson & Smith
his ATTORNEYS

N. PETERS, PHOTO-LITHOGRAPHER, WASHINGTON, D. C.

2 Sheets—Sheet 2.

J. H. RHAMY.

Wheel Cultivator.

No. 9,511. Reissued Dec. 21, 1880.

WITNESSES

John A. Ellis.

Philip Lemaei.

INVENTOR

Jno H. Rhamy, by Anderson & Smith his ATTORNEYS

N. PETERS, PHOTO-LITHOGRAPHER, WASHINGTON, D. C.

UNITED STATES PATENT OFFICE.

JOHN H. RHAMY, OF ANTIOCH, INDIANA.

WHEEL-CULTIVATOR.

SPECIFICATION forming part of Reissued Letters Patent No. 9,511, dated December 21, 1880.

Original No. 230,057, dated July 13, 1880. Application for reissue filed November 6, 1880.

*To all whom it may concern:*

Be it known that I, JOHN H. RHAMY, of Antioch, in the county of Huntington and State of Indiana, have invented certain new and useful Improvements in Wheel-Cultivators; and I do hereby declare the following to be a full, clear, and exact description of the invention, that will enable others skilled in the art to which it appertains to make and use the same, reference being had to the accompanying drawings, and to the letters of reference marked thereon, which form a part of this specification, in which—

Figure 1:
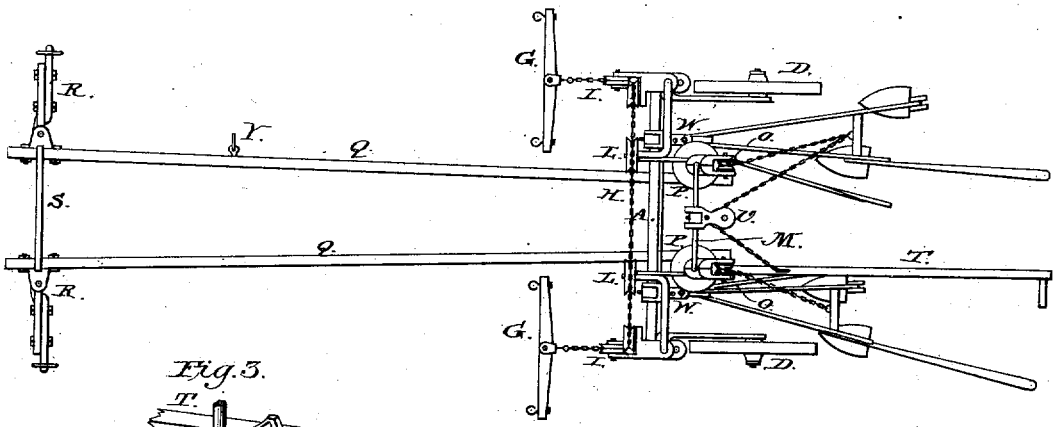
Figure 3:
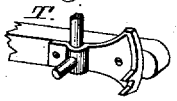
Figure 6:
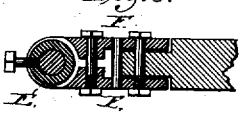
Figure 7:
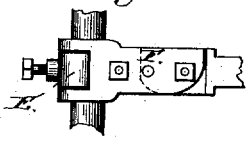
Figure 2:
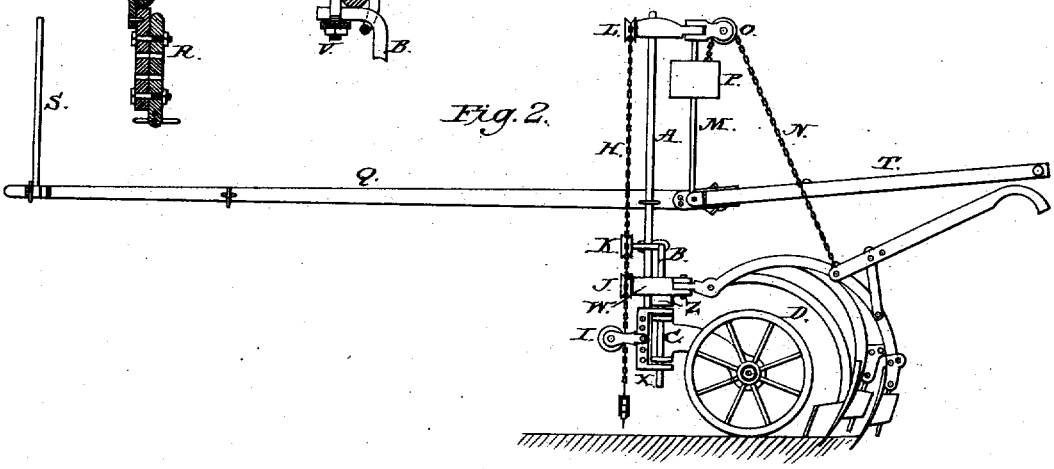
Figure 8:
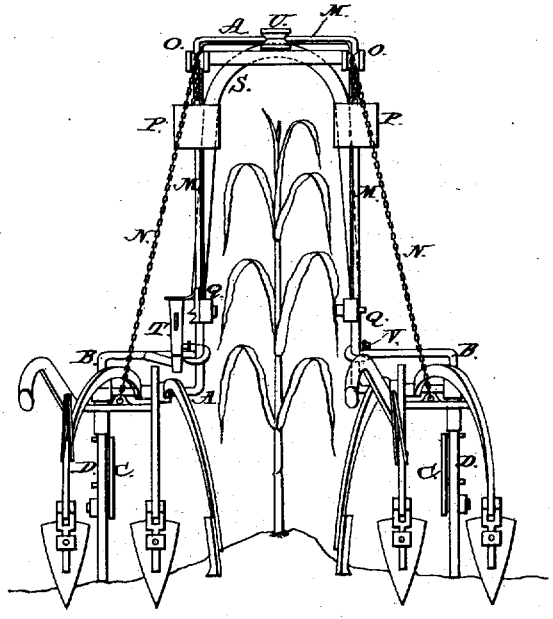

Figure 1 is a plan view of a wheel-cultivator embodying the improvements in my invention. Fig. 2 is a side elevation of the same. Figs. 3, 4, 5, 6, and 7 are detail views of various parts of the machine. Fig. 8 is a rear elevation of my improved wheel-cultivator.

This invention relates to wheel-cultivators; and it consists in the improved features of construction hereinafter fully described, and pointed out in the claims.

Referring by letter to the drawings, A designates the central arch, to the arms of which are secured the half-arches B by clamp-bolts at V and head-blocks W. Curved arms C are hinged to the lower ends of the arms of the half-arches B, and the journals for the wheels D are made in the outer ends of said arms C. The arms of the central arch, A, are bent outward and horizontally, and are passed through hinge-boxes E to form the axle. Half-joints F, square-shouldered upon the inside and round-shouldered upon the outside, are hinged to the boxes E. The plow-beams are curved upwardly, as shown, and their front ends are bolted to the hinge-joints F, their height above clevises X being regulated by washers Z of differing thickness.

A rear arch, M, is fastened at the top by clamp-bolts to the central arch, A, and at the bottom to the tongue. One end of each of the chains N is fastened to the plow-beam. The chains are then passed over pulleys O at the top of the rear arch, M, and the other end of each chain N is fastened to a weight, P, sliding on the arms of the arch M. These weights P carry the natural weight of the plows, thereby making the plows easy to handle, and when the plows have been elevated above the balancing-point the weights will hold them in such elevated position. By thus elevating the plows and making the hinge-arms C rigid by screw or otherwise, the machine can readily be moved from field to field.

Figure 4:
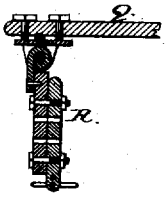
Figure 5:
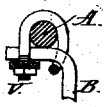

In plowing small corn the sides of the double tongue Q should be fastened together at their front ends to form a single tongue, and to compensate for the shortening of the hinged neck-yokes R, with which the sides Q of the double tongue are provided, I construct said neck-yokes R in two sections, provided with perforations through which screw-bolts may be passed, in order that said yokes may be shortened or lengthened by adjustment, as occasion may require, as is plainly shown in section in Fig. 4.

In plowing high corn, either before or after maturity, the sides Q of the double tongue are separated at their front ends by a front arch, S, and the yokes R are shortened by adjustment in accordance therewith.

The single-trees G are fastened to the ends of a chain, H, which passes under pulleys I, connected with clevises X on the arms of the half-arches B, over pulleys J, secured to the head-blocks W, under pulleys K at the tops of the half-arches B, and over pulleys L at the top of the central arch, A. By this construction the single-trees, pulleys, and chain H are all out of the way of the corn, and will pass it without injury.

The curves in the plow-beams permit the wheels D to pass under them when necessary in turning at the ends of the rows and in avoiding stumps and like obstructions. The half-hinge joints F permit the plows to play outward but not inward. The hinge-arms C permit the wheels D to turn in any direction.

The plows can be easily thrown either to the right or left by the plowman, so that he will be enabled to throw the dirt evenly to each side of the hill, regardless of its position in the row, even though the row be crooked and the hill out of place in the row.

In turning at the ends of the row it will be unnecessary to back the team or pull back the plows, because, when the team starts in upon the next row, the plows can be immediately and easily thrown into place by the plowman.

In plowing tall corn the following directions should be observed and followed: Loosen the right chain N from its weight P and attach it to the lever T, which is fastened to the tongue, as shown in an enlarged view in Fig. 3. Then move the right-hand pulley, O, to the center of the arch M, as shown at U in Fig. 1. This change converts the lever T into a handle for the right-hand plow and throws the handles for both plows upon the left-hand side of the row. The front arch, S, and the shortened neck-yokes R should be now employed on the double tongue. Tie the off horse back by a strap attached to the ring Y, and hold him to the right by a short jockey-stick fastened to the right side of the front arch, S, and drive the near horse with a single line. In this manner high corn can be plowed with comparative ease and without injury to the corn. In this instance the half-hinge joints F must be made rigid by set-pins. (See Fig. 7.)

Having thus fully described my invention, what I claim, and desire to secure by Letters Patent, is—

1. In a wheel-cultivator, the central arch, A, and half-arches B, in combination with the wheels D, connected to the half-arches B by hinge-arms C, and the curved plow-beams connected to the arch A by hinge-boxes E and half-hinge joints F, substantially as and for the purposes set forth.

2. In a wheel-cultivator, the plow-beams hinged to the arch A, as shown and described, in combination with the chains N, arch M, and weight P thereon, substantially as and for the purposes set forth.

3. In a wheel-cultivator, the plow-beams hinged to the central arch, A, by boxes E and joints F, as described, in combination with the chains N, weight P, and lever T, substantially as and for the purposes set forth.

4. In a wheel-cultivator, the double tongue Q Q, pivoted or hinged to the arch A, as shown, in combination with the hinged adjustable neck-yokes R R, ring Y, and the front arch, S, substantially as and for the purposes set forth.

5. In a wheel-cultivator, the plow-beams hinged to the central arch, A, in combination with chains F, weights P, and pulleys O.

6. In a wheel-cultivator, the combination of chain H with pulleys I, connected to clevises X, pulleys J, secured to head-blocks W, pulleys K, secured to top end of half-arches B, and pulleys L at the top of central arch, A.

7. In a wheel-cultivator, the combination of hinged plow-beams, the half-arches for supporting the wheel-arms, and the draft-attachment clevises, with a washer between the clevis and the head-blocks, whereby the height of the beam may be varied.

In testimony whereof I affix my signature in presence of two witnesses.

JOHN H. RHAMY.

Witnesses:

A. J. THORP,

F. M. COLE.